INVENTORS
ADAM J. KULIKAUSKAS
GEORGE M. DOLAN
BY John W Girvin, Jr.
ATTORNEY

July 30, 1968 A. J. KULIKAUSKAS ET AL 3,395,392

EXPANDED MEMORY SYSTEM

Filed Oct. 22, 1965 2 Sheets-Sheet 2

United States Patent Office
3,395,392
Patented July 30, 1968

3,395,392

EXPANDED MEMORY SYSTEM

Adam J. Kulikauskas, Johnson City, and George M. Dolan, Vestal, N.Y., assignors to International Business Machines Corporation, Armonk, N.Y., a corporation of New York Filed Oct. 22, 1965, Ser. No. 502,058
3 Claims. (Cl. 340—172.5)

ABSTRACT OF THE DISCLOSURE

A data processing system with means for addressing a specified storage location in a selected one of a plurality of storage units in accordance with a previously executed instruction and also in accordance with the type of storage access cycle undertaken. The plurality of storages have a combined number of addressable locations greater than the number of combinations provided by the signals available for addressing.

The present invention relates generally to data processing apparatus, and more particularly, to an expanded memory addressing system for use with such apparatus.

It is conventional practice in the use of data processing apparatus to provide a stored program in the form of coded characters termed "instruction words," the smallest discrete part of which is commonly referred to as a bit. Each instruction word is generally divided into two portions, each portion comprising a fixed number of bits. The first portion, called the operation code portion, designates the operation to be performed by the data processing apparatus on information located in the data processing apparatus, while the second portion, called the addressing portion, designates the location or locations of the information to be operated upon. The total number of storage locations of a data processing system is limited by the number of binary bits in the addressing portion of the instruction word since each storage location must be addressable. For example, if the addressing portion of an instruction word has a magnitude of ten binary bits, the total number of locations which can be addressed is $2^{10}$ or 1,024 locations.

In many data processing systems, the stored program is accessed from storage during a particular type of storage access cycle and the program is executed during a different type of storage access cycle. Generally, there are two basic types of access cycles in most data processing systems. The first may be termed an instruction access cycle wherein the program or intruction words are read out from the memory into register, decoding and analyzing circuitry. The second type of access cycle can be classified as an execution type of access cycle wherein data at locations specified by the address portion of the instruction word is accessed and operated upon in accordance with the operation code portion of the instruction word. During execution cycles, storage is accessed to either write information into storage or read information out of storage. During certain types of operation commands, it is necessary to access more than one storage location during a single execution cycle. For example, the operation portion of the instruction code might require that the data in a particular storage location be added to the data located in a second storage location. Hence, it would be necessary to access both of these storage locations during the execution cycle.

In some data processing systems, the instruction word is read out of storage during the instruction cycle serially, bit by bit. Since the reading of each bit takes a finite period of time, it s necessary to restrict the number of bits in an instruction word in order to maintain a high speed operation. However, since the number of bits in the addressing portion of the instruction word limits the storage capacity, it has been necessary to sacrifice speed when increasing storage capacity and vice versa.

Further, it is necessary to select the format of the instruction words which will constitute the stored program prior to designing the data processing system. Once the format of the instruction words has been selected, the various functional components of the apparatus such as registers, memories, decoders and the like are designed to accommodate the desired formats of the instruction words. When it has been desired to expand the storage capacity of existing data processing systems by adding an additional memory, it has been necessary to also increase the number of bits in the addressing portion of the instruction word. This required the reworking of a vast quantity of circuits and was not economically desirable.

A prior art solution of these problems is shown in the copending application, Ser. No. 79,754, now U.S. Patent 3,230,513, entitled "Memory Addressing" by Thomas B. Lewis and assigned to the assignee of the present invention. In that application, increased storage capacity is provided without increasing the size of the instruction word by providing circuitry responsive to a predetermined operation code which will preselect either the standard memory or an added memory for all subsequent operations.

While this approach performs adequately, it does not yield optimum and complete programming flexibility, especially in those data processing systems wherein storage is accessed during different types of access cycles. For example, it is desirable to have the capability and flexibility to read instruction words from a selected memory and still have the option of executing the instruction in either memory or even in both memories. This capability is not provided in the aforereferenced patent application by Lewis. Inability to accomplish this results in lost time, added instructions and general inefficiency in a high cost data processing system.

Accordingly, it is an object of this invention to add an additional storage unit to a pre-existing data processing system utilizing the pre-existing addressing structure and still maintain complete programming flexibility.

An additional object is to maintain complete programming flexibility in a data processing system whose storage capacity is greater than that derivable from the addressing portion of the instruction word.

A further object is to access any two different storage locations during the execution of a single instruction in a data processing system whose storage capacity is greater than that derivable from the addressing portion of the instruction word.

Another object is to access any storage location during an instruction cycle and access any storage location during the following execution cycle in a data processing system whose storage capacity is greater than that derivable from the addressing portion of the instruction word.

In accordance with one aspect of this invention, means are provided to enable the data processing system to read instruction words from a selected memory while still maintaining the capability to execute the instruction in the selected memory, another memory, or both memories. Exclusive gating means are provided, each of which is preset by the coded electrical signals representative of a special instruction word, and each of which is responsive to a different storage access cycle. These gating means then allow the addressing portion of the instruction word to access one of the plurality of memory units in accordance with the access cycle and the setting of the exclusive gating means.

The foregoing and other objects, features and advantages of the invention will be apparent from the following more particular description of the preferred embodiment of the invention, as illustrated in the accompanying drawings.

*General description*

Figure 1:
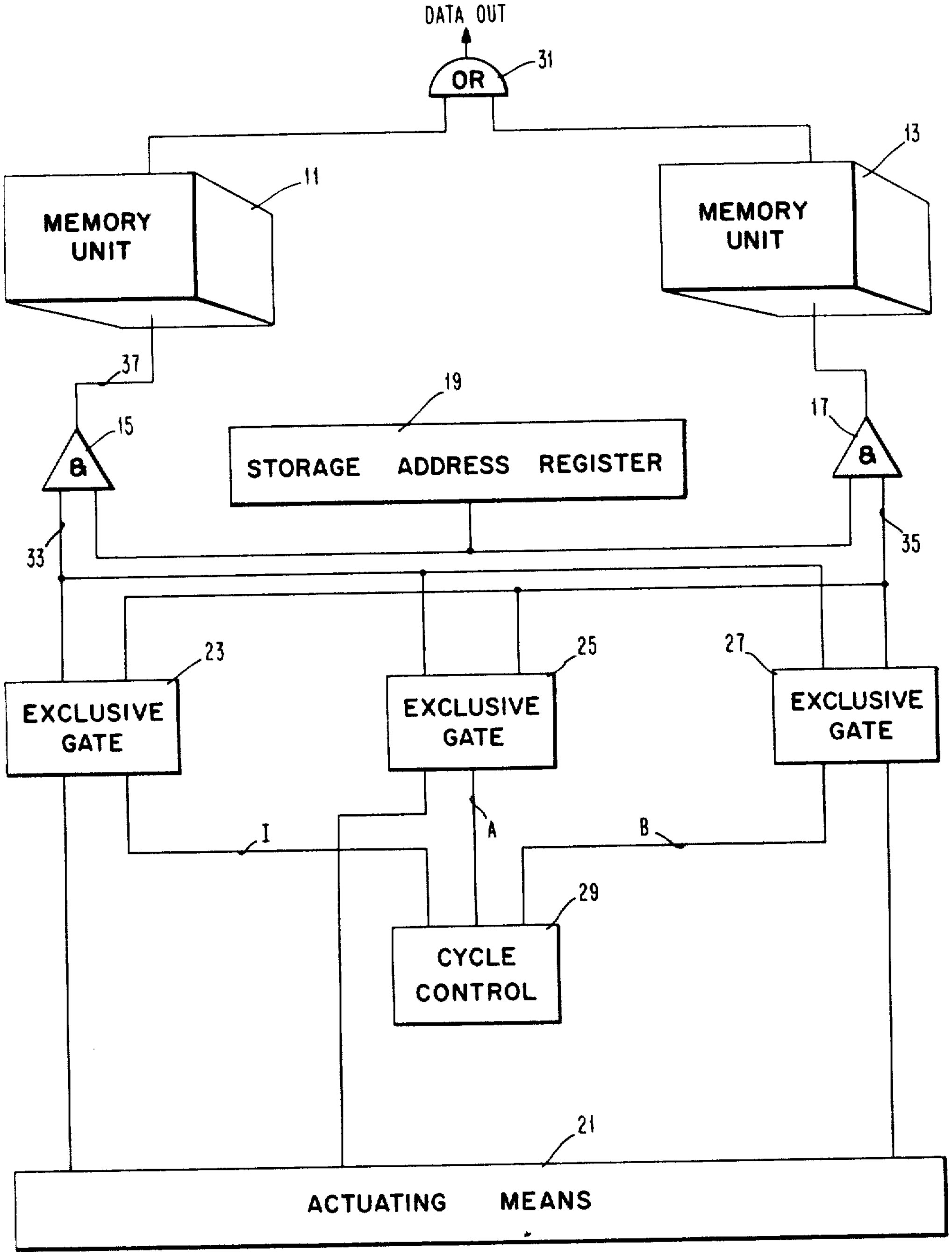
FIG. 1 is a schematic block diagram showing the storage addressing control of a data processing system utilizing the present invention.

Referring now to FIG. 1, two memory units 11 and 13 are shown. Each memory unit is responsive through coincidence circuit gating means 15 and 17 to the storage address register 19. The storage address register is capable of addressing any storage location in memory unit 11 or memory unit 13 depending upon its contents and upon the activation of the coincidence circuits 15 and 17. In order to activate either coincidence circuit 15 or coincidence circuit 17, actuating means 21 is provided. The actuating means condition each of the exclusive gating means 23, 25 and 27 to select either memory unit 11 or memory unit 13 and could consist of a switch for each exclusive gating means responsive either to manual setting, electronic setting in response to the stored program, or both manual setting and electronic setting. Cycle control means 29 has separate outputs, I, A, and B, each connected to a different exclusive gating means. Each of these outputs I, A and B is representative of a different storage access cycle. For example, line 1 could be activated during the instruction access cycles while line A could be activated during a particular type of execution access cycles and line B could be activated during a different type of execution access cycles. Since there can only be one given access cycle at any given instant of time, the outputs I, A and B are mutually exclusive.

Each of the exclusive gating means 23, 25, and 27 will be activated to present an output on line 33 or line 35 only when an input is present from the cycle control means 29. The setting of actuating means 21 determines on which line, line 33 or 35, the output will appear. The output of each exclusive gating means is connected through lines 33 and 35 to coincidence circuits 15 and 17, respectively. Thus, only one of the coincidence circuits 15 and 17 can be activated at any given instant of time.

In order to access a particular storage location in the selected memory unit, storage address register 19 is supplied with coded information which will cause the desired position of the selected memory unit, either memory unit 11 or memory unit 13, to gate out data to OR circuit 31. It is assumed that storage address register 19 can contain only sufficient data to address all of the storage positions in only one memory unit. The number of addressable storage positions in each memory unit is determined by and equal to the maximum number of combinations provided by the addressing portion of the instruction word. In order to allow storage address register 19 to uniquely address all of the storage locations in both memory units, the additional gating circuitry shown is utilized.

Assuming that it is desired to store the program instructions in memory unit 11 and execute these instructions with data located in memory unit 13, actuating means 21 would be set so that exclusive gating means 23 would present an output only on line 33 and exclusive gating means 25 and 27 would present outputs only on line 35. Thus, during subsequent instruction cycles, cycle control means 29 would supply an output on line I causing an exclusive gating means 23 to present an output on line 33. The output on line 33 gates coincidence circuit 15 so that the information in storage address register 19 can pass through line 37 to address memory unit 11 thereby causing the data at the storage location designated by the storage address register to be gated out of the memory unit 11. This data would correspond to the program instruction. During seubsequent execution cycles, cycle control means 29 supplies an output on either line A or B causing exclusive gating means 25 or 27 to supply an output on line 35. The output on line 35 gates coincidence circuit 17 so that the contents of the storage address register 19 will cause the data in the desired storage location of memory unit 13 to be gated out.

Thus, it is seen that the storage address register 19 will address a particular position in either memory unit 11 or memory unit 13 depending upon the setting of the actuating means 21 and the access cycle as determined by cycle control means 29.

*Detailed description of components*

Figure 2:
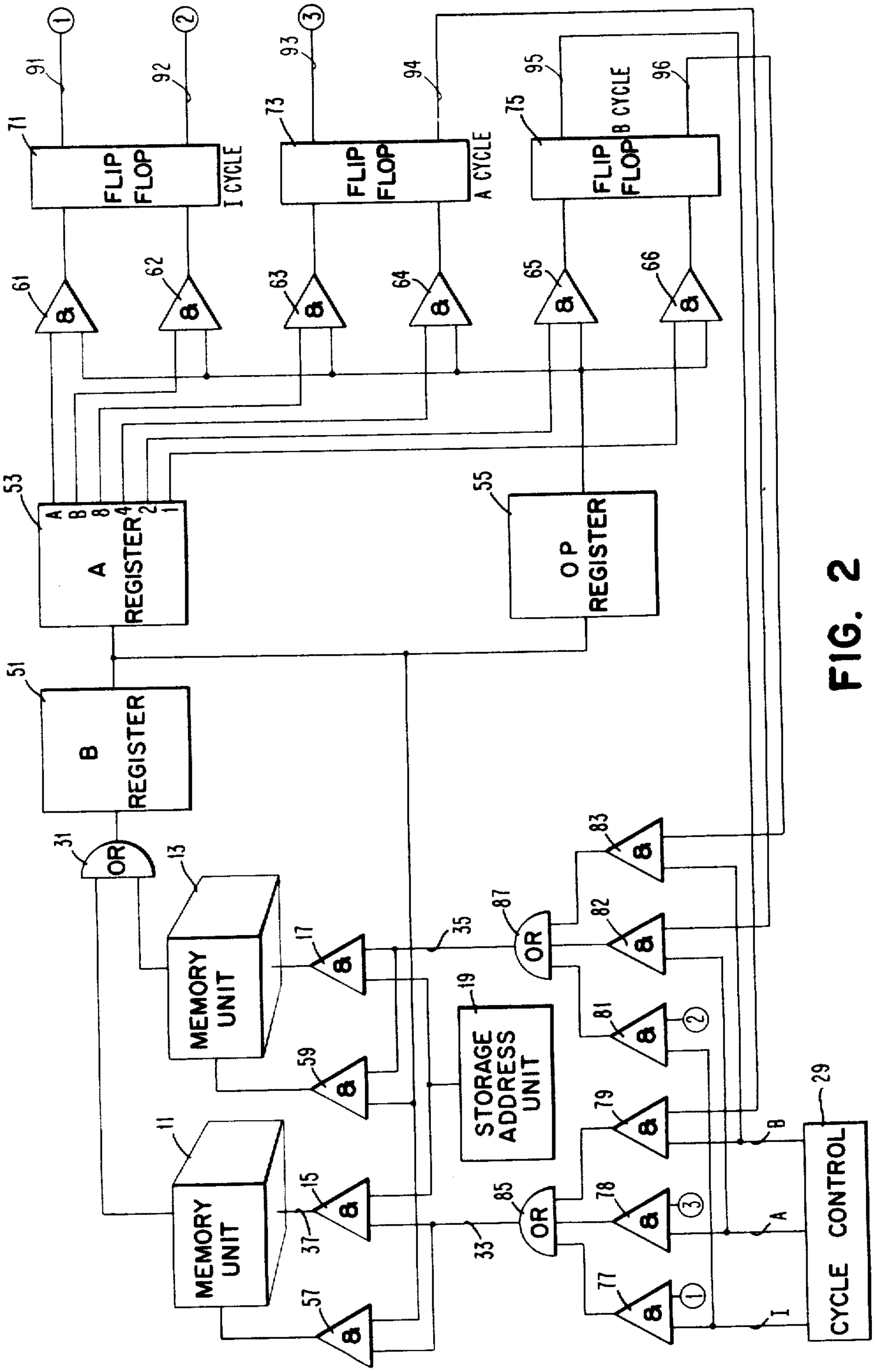
FIG. 2 is a schematic block diagram showing in more detail the storage addressing control of a data processing system utilizing the present invention.

Referring now to FIG. 2, a more detailed representation of the present invention is shown. Storage address register 19 addresses either memory 11 or memory 13 in accordance with its contents and upon the actuation of coincidence circuits 15 and 17 is described above. The coincidence circuits are well known in the art and present an output whenever all inputs are present. While the coincidence circuits 15 and 17 are shown as a single circuit, is it recognized that in order to read the addressing information from the storage address register 19 out in parallel form it would be necessary to supply a coincidence circuit to gate each parallel output. The storage address register 19 and the memory unit 13 are described in more detail in U.S. Patent No. 3,077,580, entitled "Data Processing System" by F. O. Underwood, issued Feb. 12, 1963, and assigned to the assignee of the present invention. Memory unit 11 is similar in all respects to memory unit 13. OR circuit 31 is responsive to both memory unit 11 and memory unit 13 to receive the data which is gated out from the addressed position of the memory. The OR circuit is well known in the art and provides an output whenever any input is present. Once again, it is recognized that the OR circuit 31 is shown as a single circuit; but in order to read out data from the memory in parallel form, it would be necessary to supply an OR circuit for each parallel output. The output of OR circuit 31 is connected to B register 51. B register 51 is connected to A register 53, operation register 55, coincidence circuit 57 and coincidence circuit 59. A more detailed description of the B register, A register, operation register and their interconnections, is contained in the aforereferenced U.S. patent to Underwood. The A register contains six binary information bits designated as A, B, 8, 4, 2 and 1 which are stored in six bit latches. The output of each bit latch is connected to a different coincidence circuit 61–66, the output of the A bit bit latch being connected to coincidence circuit 61, the B bit bit latch to coincidence circuit 62 and so on. Each of the coincidence ciruits 61–66 is also connected to and responsive to a preselected output of the operation register 55. This output appears as an output of the decode circuit which is described in the aforereferenced U.S. patent to Underwood at col. 5, lines 60–74. The outputs of the coincidence circuits 61–66 are connected to flip-flop circuits 71, 73 and 75.

Each of the flip-flop circuits 71, 73 and 75 are well known in the art and each supply two outputs, one for each of its stable states. As can be seen, each flip-flop is gated by the outputs of two of the coincidence circuits 61–66, one for each stable state. The flip-flop will assume one stable state upon the appearance of a signal at one of its inputs and remain in that stable state until a signal appears at the second input whereupon it will change to its other stable state. The outputs of coincidence circuits 61, 63 and 65 cause flip-flop circuits 71, 73 and 75, respectively, to assume a stable state so that outputs will appear on the top-most output lines 91, 93 and 95 of each flip-flop while the outputs of coincidence circuits 62, 64 and 66 cause flip-flop circuits 71, 73 and 75, respectively, to assume their other stable state and present outputs on lines 92, 94 and 96. The top-most output lines 91, 93 95 of each flip-flop circuit 71, 73 and 75, respectively, shown schematically in FIG. 2, have been arbitrarily chosen to cause memory unit 11 to be selected, while the bottom-most output lines 92, 94 and 96 of the flip-flops will cause memory unit 13 to be selected. Each flip-flop corresponds to an access cycle as will be explained later.

The outputs of flip-flops 71, 73 and 75 are connected to coincidence circuits 77–79 and 81–83 so that the top-most line of each of the flip-flops is connected each to a different one of the coincidence circuits 77–79, while the bottom-most line of each of the flip-flops is each connected to a different one of the coincidence circuits 81–83. Each of the coincidence circuits 77–79 and 81–83 are also responsive to cycle control means 29. Cycle control means 29 is described in the aforereferenced U.S. patent to Underwood. Each of its three outputs shown, I, A and B, are obtained from a series of latches designated delta I, delta A, and delta B, respectively, in the aforementioned patent at col. 8, line 60, et seq. Each output of cycle control means 29, I, A and B, is uniquely connected to one of the coincidence circuits 77–79 and also to one of the coincidence circuits 81–83. As mentioned before, each flip-flop corresponds to a different access cycle. For example, flip-flop 71 corresponds to the instruction access cycles, flip-flop 73 corresponds to A access cycles, and flip-flop 75 corresponds to B access cycles. The top-most outputs of the flip-flops are each uniquely connected to one of the coincidence circuits 77–79 and the bottom-most outputs of the flip-flops are each uniquely connected to one of the coincidence circuits 81–83 so that flip-flop 71 corresponding to instruction cycles is connected to those coincidence circuits 77 and 81, which are connected to output I of cycle control means 29, flip-flop 73 corresponding to A cycles is connected to those coincidence circuits 78 and 82, which are connected to output A of cycle control means 29, and flip-flop 75 corresponding to B cycles is connected to those coincidence circuits 79 and 83, which are connected to output B of cycle control means 29. Since the outputs of the cycle control means 29 are mutually exclusive as are the two outputs of each flip-flop only one of the coincidence circuits 77–79, 81–83 may present an output at any one given period of time.

The outputs of coincidence circuits 77–79 are connected to OR circuit 85, and the outputs of coincidence circuits 81–83 are connected to OR circuit 87. The output of OR circuit 85 is connected to coincidence circuit 15 and to coincidence circuit 57 and the output of OR circuit 87 is connected to coincidence circuit 17 and the coincidence circuit 59. Since only one of the coincidence circuits 77–79 and 81–83 may be activated during any given instant of time, it follows that only one of the OR circuits, 85 and 87 can be activated at any given instant of time. Therefore, only one of the coincidence circuits 15 or 17 can be gated at any given instant of time. Hence, storage address register 19 will address either memory unit 11 or memory unit 13 through coincidence circuit 15 or 17, respectively, in accordance with the OR circuit 85 or 87 which is activated. Information in the B register 51 is gated back to either memory unit 11 through coincidence circuit 57 or memory unit 13 through coincidence circuit 59 in accordance with the OR circuit, OR circuit 85 or OR circuit 87, which is activated.

*Operation of apparatus*

The stored program in the form of coded electrical information bits located in one or both of the memory units 11 and 13 determines which memory units will be selected during subsequent operations in accordance with the desires of the programmer. The programmer is able to make such a selection by utilizing a special programming instruction which will cause flip-flops 71, 73 and 75 to be set according to the memory units that he desires to select during subsequent instructions. This special instruction consists of special operation command and a modifier character. The operation command is gated out of either memory unit 11 or 13 and passes through OR circuit 31 into B register 51 and then to operation register 55 wherein it is stored until the operation has been executed. During the next storage access cycle, the modifier character is read from the next higher order position of storage and gated through OR circuit 31 into B register 51 and to A register 53 in the manner described in the aforereferenced U.S. Patent 3,077,580. As mentioned before, the top-most output of each flip-flop 71, 73 and 75 selects memory unit 11 while the bottom-most output of each flip-flop selects menory unit 13. Further, each flip-flop corresponds to a defferent access cycle. Hence, if the programmer desires to select memory unit 11 during instruction cycle, memory unit 13 during A cycles, and memory unit 11 during B cycles, he would program the special operation code into storage followed by a modifier character having an A bit, a 4 bit, and a 2 bit. The modifier character would be stored in the bit latches of the A register and gate coincidence circuits 61, 64 and 65. The special operation code causes an output to appear from the operation register 55 which also gates these coincidence circuits. Coincidence circuits 61, 64 and 65 having both inputs present will each present an output to flip-flops 71, 73 and 75, respectively. This will gate flip-flop 71 which corresponds to instruction access cycles to select memory unit 11 through its top-most output 91, flip-flop 73 which corresponds to A access cycles to select memory unit 13 through its bottom-most output 94, and flip-flop 75 which corresponds to B access cycles to select memory unit 11 through its top-most output 95.

The outputs of these flip-flops appear as continuous signals at coincidence circuits 77–79 and 81–83. Since the top-most, bottom-most, and top-most outputs of flip-flops 71, 73 and 75, respectively, are activated, coincidence circuits 77, 82, and 79 each have an activated gating input which is connected to the outputs of the flip-flops, while coincidence circuits 81, 78 and 83 have an input with no gating signal present connected to the outputs of the flip-flops. During subsequent instruction cycles, cycle control means 29 will provide an output at line I thus gating coincidence circuits 77 and 81. Since only coincidence circuit 77 has another input, only it will provide an output. This output is applied to OR circuit 85, whose output gates coincidence circuit 15. OR circuit 87 having no input supplied, will not provide an output and hence coincidence circuit 17 will not be gated. Thus, during instruction cycles, the storage address register 19 will cause memory unit 11 to gate out information through coincidence circuit 15 in accordance with the address contained in the storage address register 19.

After the instruction, located in memory unit 11 at the address specified by the storage address register 19, has been gated out of the memory into the operation register and other appropriate registers, the data processing system will then cause the instruction to be executed as described in the aforereferenced U.S. patent to Underwood. Execution cycles will consist of A cycles and B cycles. During A cycles, the storage adddress register 19 will select address positions in memory unit 13 through coincidence circuit 17, while during B cycles storage address register 19 will select address positions in memory unit 11 through coincidence circuit 15. This gating is accomplished through the activation of coincidence circuit 82 during A cycles and the activation of coincidence circuit 79 during B cycles in a manner similar to that described above with respect to the activation of coincidence circuit 77 and will not be further described herein.

In order to more fully appreciate the present invention and to understand its operation, the execution of a typical instruction will be traced through. If, for example, the instruction to be executed was to add the data located in storage position 300 of memory unit 13 to the data located in storage position 400 of memory unit 11, the data processing system would proceed as follows:

Flip-flops 71, 73 and 75 would be set as described above by the execution of a special program instruction so that the outputs 91, 94 and 95 of the flip-flops 71, 73 and 75, respectively, would be activated thereby causing OR circuit 85 to be activated during instruction and B access cycles and OR circuit 87 to be activated during A access cycles. The next instruction, calling for the addition of the data located in storage position 300 of memory unit 13 to the data located in storage position 400 of memory unit 11, would be read out of memory unit 11 during instruction cycles from the location specified by the storage address register 19. This location information is supplied to the storage address register from the instruction counter in a manner described in the aforereference U.S. patent to Underwood. Thus, on successive storage access cycles, the following instruction would be read out of the memory unit into the operation register and other appropriate registers: $\bar{A}$300400.

Upon recognizing that the complete instruction has been read out, the data processing system shifts into an execution mode. Location 300 is stored in the A storage address register while location 400 is stored in the B storage address register. Both of these registers and the manner in which they obtain the address information of the instruction word is shown and described in the aforereferenced U.S. patent to Underwood. During A cycles, the contents of the A storage address register is read into the storage address register 19 while during B cycles, the contents of the B storage address register is read into the storage address register 19.

Thus, during the first A cycle, following the last instruction access cycle, storage address register 19 contains address 300. This information is gated through coincidence circuit 17 which has been activated by OR circuit 87 to cause the data information located in storage locations 300 of memory unit 13 to be gated out through OR circuit 31 into the B register and other appropriate logic circuitry. During the following B cycle, the storage address register 19 will contain storage address location 400. This information will be gated through coincidence circuit 15 which has been activated by OR circuit 85 causing the data located in location 400 of memory unit 11 to be gated out of the memory to OR circuit 31 into the B register 51 and other appropriate logic circuitry. The result of the addition is inserted into the B register and stored during a later portion of the B cycle. This information is gated from the B register 51 to coincidence circuits 57 and 59. Since OR circuit 85 is activated while OR circuit 87 is not activated, coincidence circuit 57 will allow the data to pass into memory unit 11 while coincidence circuit 59 will not allow the data to pass into the memory unit 13. The data is written back into the location specified by the storage address register 19 which still contains location 400. Thus, the result of the addition is written back into storage position 400 of memory unit 11.

When it is desirable to change the memory units from which the program is to be read or from which the data is to be manipulated, all that need to be done is to program the special instruction followed by a character which will select the desired memory units. Thus, it is possible to select any position of storage for the execution of a single instruction which can be located in any positions of storage.

While the invention has been described with reference to two memory units, it is apparent that more than two memory units can be added by providing a sufficient number of flip-flop circuitry and gating circuitry. Further, the two memory units shown and described throughout the specification need not be physically distinct, but may be two portions of the same memory unit.

While the invention has been particularly shown and described with reference to the preferred embodiment thereof, it will be understood by those skilled in the art that various changes in form and details may be made therein without departing from the spirit and scope of the invention.

What is claimed is:

1. A data processing system wherein storage accesses are made during different access cycles comprising:
   - a coded electrical signal source consisting of a predetermined total discrete number of electrical signals presented as an output, said total discrete number of electrical signals having a fixed portion for addressing and the remainder for operation commands;
   - a plurality of memory units having a combined number of addressable locations greater than the number of combinations provided by the number of discrete signals available for addressing;
   - cycle control means for determining different access cycles;
   - addressing means capable of addressing a plurality of storage locations within a selected one of said memories;
   - mutually exclusive gating means responsive to said cycle control means and selectively actuable to connect said addressing means to a selected one of said memory units;
   - actuating means responsive to the coded electrical signal source for selectively actuating said gating means.

2. A data processing system wherein storage accesses are made by a common set of circuits during different access cycles having a stored program in the form of coded electrical signals which consist of instruction words having an operation code portion and an addressing portion comprising:
   - a plurality of memory units each capable of storing said stored program and having a combined number of addressable locations greater than the number of combinations porvided by the addressing portion of the instruction word;
   - cycle control means for determining different access cycles;
   - addressing means capable of addressing a plurality of storage locations within a selected one of said memory units;
   - bistable circuit means responsive to a certain combination of the coded electrical signals of the stored program providing a continuous output on certain ones of a plurality of output lines, in accordance with the combination of coded electrical signals; and
   - gating means responsive to said bistable circuit means and to said cycle control means for connecting said addressing means to a selected one of said memory units so that both memory units can be accessed during a single instruction execute cycle.

3. A data processing system wherein storage accesses are made by a common set of circuits during different access cycles having a stored program in the form of coded electrical signals which consist of instruction words having an operation code portion and an addressing portion comprising:
   - two memory units each capable of storing said stored program and each having a number of addressable locations greater than the number of combinations provided by the addressing portion of the instruction word;
   - cycle control means for determining different access cycles;
   - addressing means capable of addressing a plurality of storage locations within a selected one of said memory units;
   - a plurality of flip-flop circuits each corresponding to a different access cycle and each actuable by a certain combination of the coded electrical signals of the stored program to assume either of two stable states, each stable state corresponding to a memory unit;

gating means responsive to said flip-flop circuits and to said cycle control means to connect said addressing means to a selected one of said memory units so that both memory units can be accessed during a single instruction execute cycle.

References Cited

UNITED STATES PATENTS

| | | | |
|---|---|---|---|
| 3,230,513 | 1/1966 | Lewis | 340—172.5 |
| 3,238,510 | 3/1966 | Ergott | 340—172.5 |
| 3,292,151 | 12/1966 | Barnes et al. | 340—172.5 |

PAUL J. HENON, *Primary Examiner.*